US006890090B2

(12) United States Patent
Weihing et al.

(10) Patent No.: US 6,890,090 B2
(45) Date of Patent: May 10, 2005

(54) HEADLIGHT FOR A MOTOR VEHICLE

(75) Inventors: Gerhard Weihing, Gomaringen (DE); Karl Ruoff, Sonnenbuehl (DE); Hans-Joachim Schmidt, Dusslingen (DE); Michael Scholl, Gomaringen (DE); Guenter Steinert, Reutlingen (DE); Duane Schliebe, El Paso, TX (US)

(73) Assignee: Automotive Lighting Reutlingen GmbH, Reutlingen (DE)

(*) Notice: Subject to any disclaimer, the term of this patent is extended or adjusted under 35 U.S.C. 154(b) by 0 days.

(21) Appl. No.: 10/213,253

(22) Filed: Aug. 6, 2002

(65) Prior Publication Data

US 2003/0031027 A1 Feb. 13, 2003

(30) Foreign Application Priority Data

Aug. 8, 2001 (DE) ........................................ 201 13 174
Dec. 18, 2001 (DE) ........................................ 201 20 418

(51) Int. Cl.[7] ................................................ B60Q 1/04

(52) U.S. Cl. ........................ 362/539; 362/507; 362/510

(58) Field of Search ................................ 362/534, 303, 362/509, 305, 539, 507, 510

(56) References Cited

U.S. PATENT DOCUMENTS 5,582,480 A * 12/1996 Zwick et al. ............... 362/298
5,971,575 A * 10/1999 Matubara .................... 362/510
6,012,830 A * 1/2000 Fraizer ....................... 362/539
6,375,341 B1 * 4/2002 Denley ....................... 362/539

* cited by examiner

*Primary Examiner*—Stephen Husar
*Assistant Examiner*—Peggy A. Neils
(74) *Attorney, Agent, or Firm*—Michael J. Striker

(57) ABSTRACT

A headlight for a motor vehicle includes a clear, front cover plate (12), at least one light source (14), and at least one reflector (16) associated with the light source (14). A beam shield (14) for avoidance of glare produced by headlights of oncoming vehicles is provided, with the beam shield (18) being disposed between the light source (14) and the cover plate (12). The beam shield (18) has a structured surface (26) with an arbitrary or selected geometric pattern on an inner side facing said light source (14).

24 Claims, 5 Drawing Sheets

HEADLIGHT FOR A MOTOR VEHICLE

BACKGROUND OF THE INVENTION

The present invention relates to a headlight for motor vehicles, particularly with clear, front cover plates with at least one light source as well as at least at least reflector associated with the light source and a beam shield disposed between the light source and the cover plate for avoiding the glare from oncoming vehicles.

In order to minimize the glare value for oncoming vehicles, beam shields are provided on at least one side, that is, on their inner sides, with a black lacquer surface.

With headlights with clear cover plates, however, a black, false flash is reflected, which is formed by the inner side of the beam shield, in the reflector, and released through the black inner coating of the shield. This false flash is visible to an observer standing in front of the vehicle. The visibility of the black false is not desirable from a design perspective.

In addition, particularly with small beam shields, the danger exists that, based on temperatures of the light source, a dampening of the lacquer takes place. This lacquer layer, then, breaks down on the inner side of the cover plate, so that a headlight of this type must be changed for technical as well as for design reasons.

With the use of beam shields that do not have a dark surface, however, the glare value is increased. This is particularly true for beam shields that were previously chrome-plated. The corresponding legal standards, then, cannot be achieved.

Under the term "beam shields", beam shields should also be understood that use projection modules, as well as beam shields in the form of cover caps, which are arranged directly in front of the light source and which have a top- or cap-shaped component that is arranged in front of the light source.

SUMMARY OF THE INVENTION

From the above state of the art, the present invention addresses the problem of simultaneously reducing the glare value, so that the previously described, legal values can be achieved, and placing a beam shield in such a way that a dampening of the lacquer layer cannot occur.

By means of a headlight, in which the inner side of the beam shield that faces the light source has a structured surface that increases the roughness of the inner side, the degree of reflection can be minimized to a required state in the headlight with particularly bright or metal-colored surfaces.

In this connection, either a geometric pattern or else an arbitrary roughness of the surface of the inner side can be provided.

In particular, it can be provided that the structured surface is produced by glazing having a roughness and/or pattern. This type of process is designated as topochromatic glazing. The advantage of the glazing material lies in the fact that the beam shields can be made from a sheet material by folding, whereby no additional lacquer is necessary to minimize reflection, which can lead to dampening and thus to formation of a coating on the headlight. In addition, the glazing process on sheet material is less expensive to perform than a supplementary application of a lacquer layer on the prepared beam shield.

These advantages can also be achieved in further methods for structuring the surface, in particularly, by means of stamping the inner side of the beam or by sandblasting the same.

In particular, with a stamping process, it is advantageous if the stamping step can be integrated in the follow-on press tool. The stamping of the beam shield's inner surface takes place by folded or rolled beam shields in appropriately and evenly trimmed condition. Through a combination of stamping or stamping and surface roughness depressions, as well as a smaller degree of shine, the anti-glare effect can be further optimized. The beam shield is encompassed hereby in a follow-on tool and is provided with a geometrically defined structure on the inner side through an additional stamping step in the same tool.

In this manner, the light beams sent out from the light source are diffused uniformly from the structured inner side of the beam shield and reflected back in the reflector. In addition, based on the increased roughness, the reflection is generally reduced.

In particular, however, the directed, transmitted light is suppressed and the stray light forwarded by the reflector is reduced. This diffused reflection simultaneously improves traffic signal illumination.

Therefore, by means of various stamping structures, different optical characteristics are achieved.

In conclusion, the stamping provides the following advantages, namely, a savings on cost by integration of the structuring process in the follow-on tool, accurate repeatability of the formation of the structuring, and greater constructive free space upon the creation of beam shields, since with the stamping process, accurate geometric shapes can be achieved, which, with subsequent computer-supported simulation, can be used.

When the beam shields are provided with a structuring through sandblasting, an irregular structural picture is provided, for example, ceramic spheres or balls can be used for sandblasting, in particular when the surface of the beam shield has been previously chrome-plated, but also all other known blasting means are contemplated, such as, for example, corundum, glass spheres, ceramic powder, and so on.

In particular, it can be provided that the beam shields have only a partially structure surface, whereby the structuring can have a cross-grated machining guide ways, a needle-strip structure, a diamond, bevel or pyramid structure. Alternatively, other disordered structures, such as those created by sand blasting, can be provided. In this case, before the sand blasting, cover foil perforated with the pattern to be applied (for example, on the sheet material) can be applied before folding. However, it is also contemplated that solid coverings in a filter unit with corresponding feed or advancement could be used.

In each case, however, an increased peak-to-valley height compared to the original material must be achieved, whereby in particular, only the zones of the beam shield that are critical for blocking can be machined.

It can also be provided that the beam shields additionally are sand blasted on their outer sides. In order to achieve only a partial structuring of the surface by sand blasting, it can be provided that before the sand blasting, coverings are applied, and so only individual areas of the beam shields are machined.

With a stamping process, for example, a honeycomb structure or similar structures, such as those used on other goods like tapestries, for example, can be applied. It is also contemplated that a firm or corporate logo can be pressed or stamped in a viewable area of the beam shield so that it is visible from the outside.

Collectively, in regard to top-shaped beam shields and the covering caps associated with them, it can be provided that these beam shields are formed as one-piece or two-piece having a top area and a holder.

In addition, it can also be provided that both the inner and outer sides of the beam shields are chemically treated, in particularly, etched, macerated, and/or tempered. In this manner, for example, a synthetic change can be achieved. By means of these chemical pre-treatments and/or post-treatments, the surface structure can be changed, and therewith, the roughness, so that a further reduction in reflection take place. Further, through a post-treatment, a change in the degree of glare can be provided.

On design grounds, it can be provided that the beam shields are eloxadized on their inner and outer sides, particularly, color eloxadized, and this eloxadizing process is used at least partially. In particular, it can be provided that the inner sides of the beam shield are eloxadized to be dark or black. This can achieve the desired results without structuring, with regard to the reduction of glare. Indeed, while this process could provide the disadvantage that a reflection in the reflector of the black inner side can be seen, it does not lead to the disadvantage of a dampening of the lacquer, and therewith to the necessity of replacing the headlight.

Alternatively, it can also be provided that in the top area, dark or black eloxadized aluminum or aluminum embedded parts can be used for the purpose of minimizing glare. In this manner, manufacturing is particularly simple.

In particular, a beam shield can be used, which is made from steel with an aluminum-silicon coating. In addition, the beam shield specifically can be made from DX53 D+AS, whereby this type of steel sheet is described in the German industry standard as DIN 10154 and DIN 10143.

The coating thickness of the eloxal layer is approximately 10 $\mu$. However, thinner layers are also possible. The beam shield material DX53 D+AS has an aluminum-silicon composition in the range of thickness from 20 to 40 $\mu$ and can also be made with more intense compositions. In particular, it can be provided that the material is eloxadized brown on one side, whereby upon use of the material DX53 D+AS, the positive qualities, such as vibrating strength of the beam shield, which upon pure aluminum beam shields is not sufficient, and the coloration possibilities of the aluminum layers by eloxadizing, are obtainable.

Moreover, aluminum or aluminum-alloy plated steels can be used. These can be eloxadized on one or two sides.

In addition, it can be provided that the inner and/or outer sides of the beam shield are chrome-plated. Particularly, it can be provided that the application of the surface structure takes place before the chrome-plating process. First, then, the inner sides of the beam shield are provided with an increased roughness, and then the outer side of the beam shield can be chrome-plated in a special machining process, so that this has an especially high degree of glaze or shine and offers a special optical design for the headlight.

However, also with protective machining, for example, through sand blasting, the already chrome-plated surfaces can only carry so much material that as a result, no danger of corrosion exists. Thus, sand blasting on chrome-plated shields, as well as on aluminum sintered shields and stainless steel shields, is particularly advantageous. It is also contemplated, then, that all of the other process for applying a structuring can take place after chrome-plating or other types of coating processes.

Besides beam shields made from the material DX53 D+AS, materials with pure aluminum or aluminum alloy coatings can also be used.

The outer side of the beam shield can be color-coated or lacquered, or the caps of the beam shield tops with beam shields having multiple parts can be color-lacquered, coated, and/or eloxadized.

Particularly, the outer side of the beam shield can have a structuring, specifically, a geometric pattern, in order to achieve further advantages in design.

By means of topochromatic glazing, for example, the inner sides of the beam shield can have an intermediate peak-to-valley height (RA) of 1.0 to 3.0 $\mu$m, whereby this peak-to-valley height is continuously achievable. Finally, the degree of shine or glare of the inner side of the beam shield, at a value of 20° is <20%, with 60° is <60%, with 85° is <25%, and in particular, is <10% with 20°, <30% with 60°, and <12% with 85°. Corresponding values are also achieved with a stamping or sand blasting process.

The measurement of the degree of glare can take place by means of a reflectometer, whereby the measurement, for example, can take place following the German industry norm DIN 67530 or the ISO 2813. The aluminum-silicon coating can have a thickness on the steel sheet of approximately 20 $\mu$m per side and a weight of 120 g/m$^2$ for both sides. The aluminum-silicon alloy comprises 90% aluminum and 10% silicon. This type of coated steel has a particularly good heat resistance.

DETAILED DESCRIPTION OF THE PREFERRED EMBODIMENTS

Figure 1:
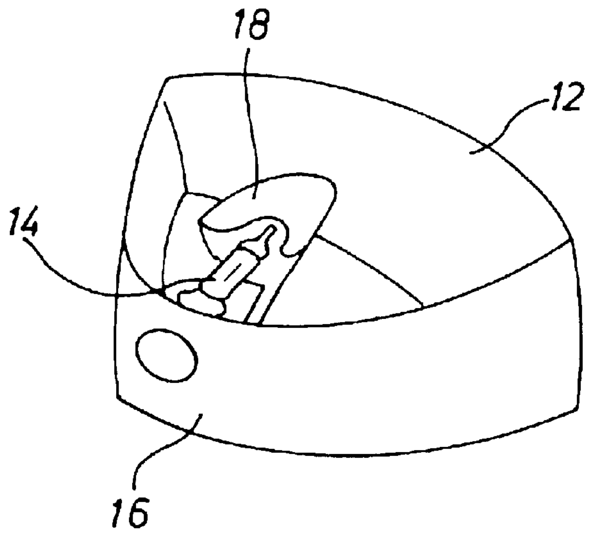
FIG. 1 shows a schematic illustration of a Kfz-headlight in a cut-away representation.

FIG. 1 shows a cut-away through a headlight of the present invention comprising a transparent cover plate 12 as well as a light source 14 and a reflector 16, whereby for avoiding glare of oncoming vehicles, a beam shield 18 is disposed in front of the light source.

Figure 2:
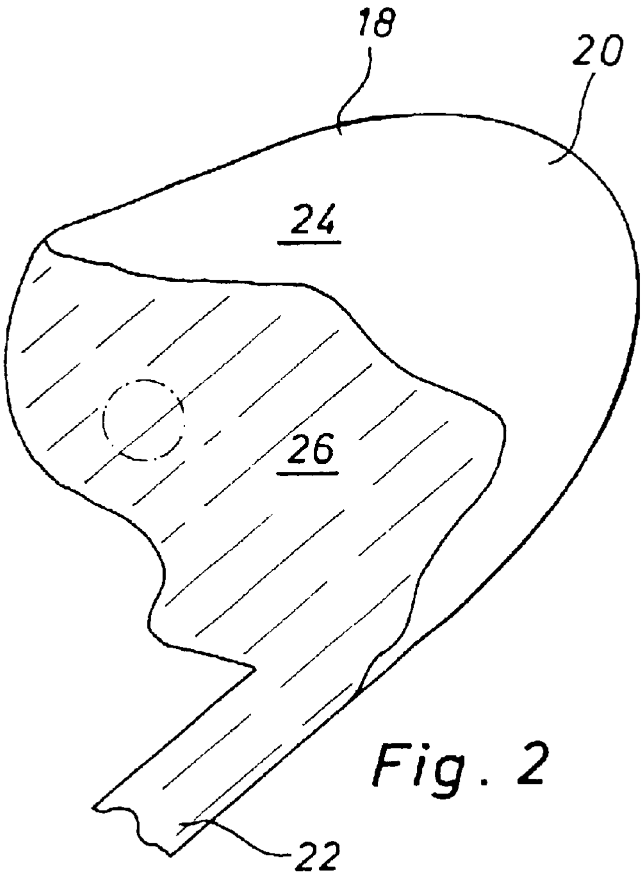
FIG. 2 shows a beam shield.

The beam shield 18, as shown in the enlarged representation in FIG. 2, comprises a calyx-type section 20, which lies in front of the light source, as well as a fastening part 22. The calyx-type section 20 includes an outer side, that is, an outer surface 24, as well as an inner surface 26.

The outer surface 24 is chrome-plated, in order to achieve a better optical effect, since the beam shield 18 can be seen well through the clear cover plate 12 from the outside.

Figure 3:
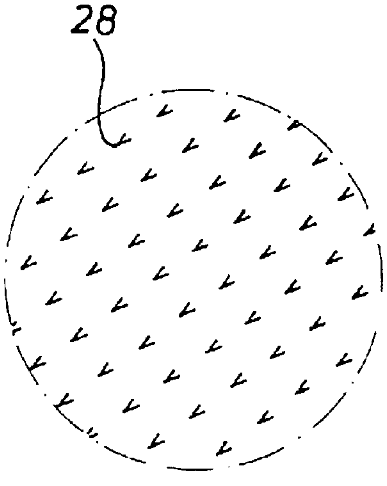
FIG. 3 shows a cut-away section of the beam shield of FIG. 2.

The inner side 26 of the beam shield comprises a surface with a pressed or stamped structure, which is shown in an enlarged representation in FIG. 3. The inner side 26 is so configured, in particular, to avoid directing light rays upwardly, which can lead to a glare of the oppositely traveling traffic. The pressed structure has pyramid-shaped impressions 28 in the shape of a geometrically defined pattern with defined depressions, whereby the reflection of the inner side 26 of the beam shield 18 is reduced to such a point that the legally prescribed illumination values can be maintained.

The beam shield 18 is punched out of a belt material and then shaped by means of a shallow-drawing method. The stamping takes placed in a following-on tool after the shallow-drawing of the beam shield 18.

By varying the geometric pattern, different shielding values can be created.

Figure 4A:
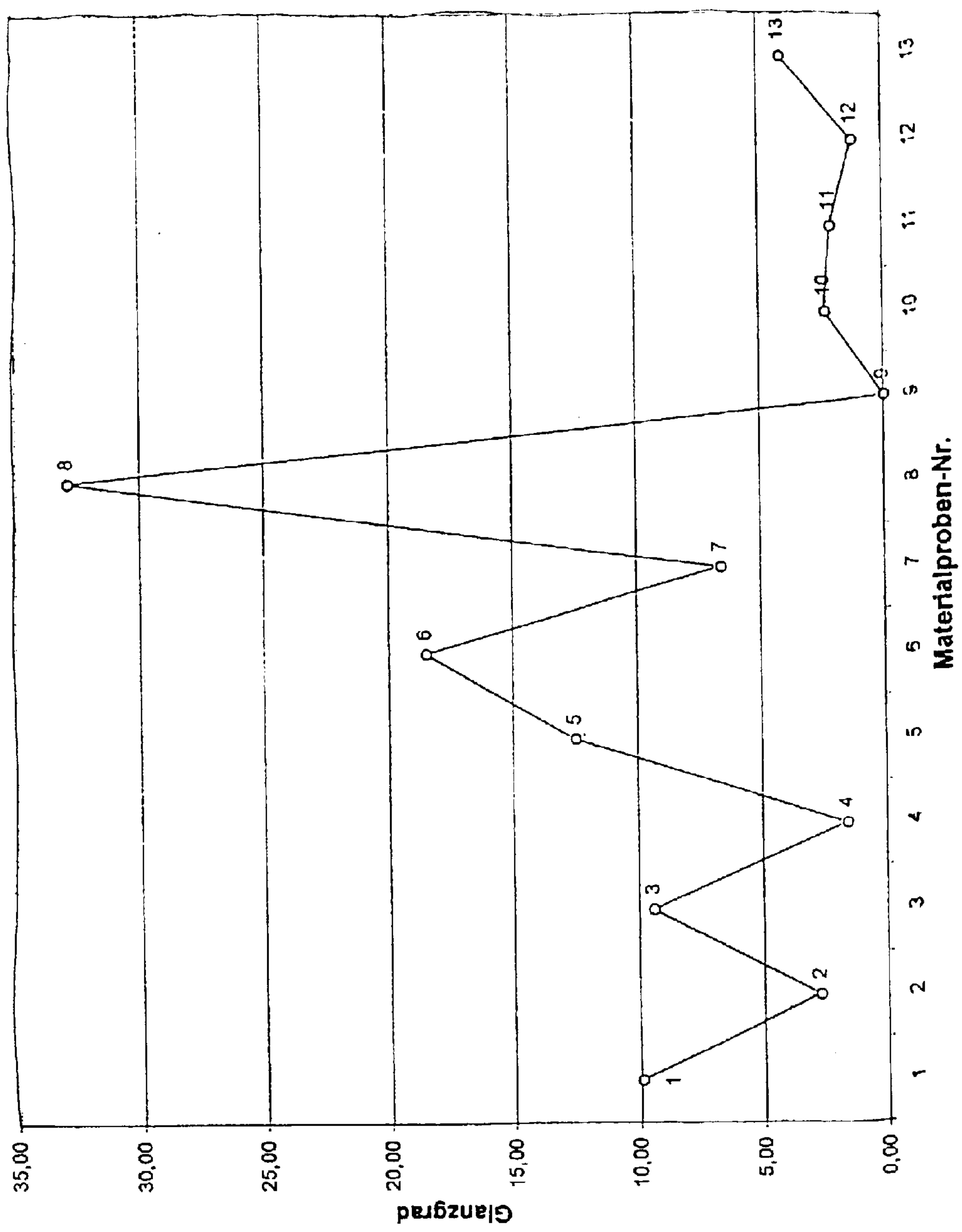
FIG. 4 shows in the illustrations A, B, and C the degree of glare by a 20° angle of incidence, 60° and 85° angles of incidence for a series of material probes.
Figure 4B:
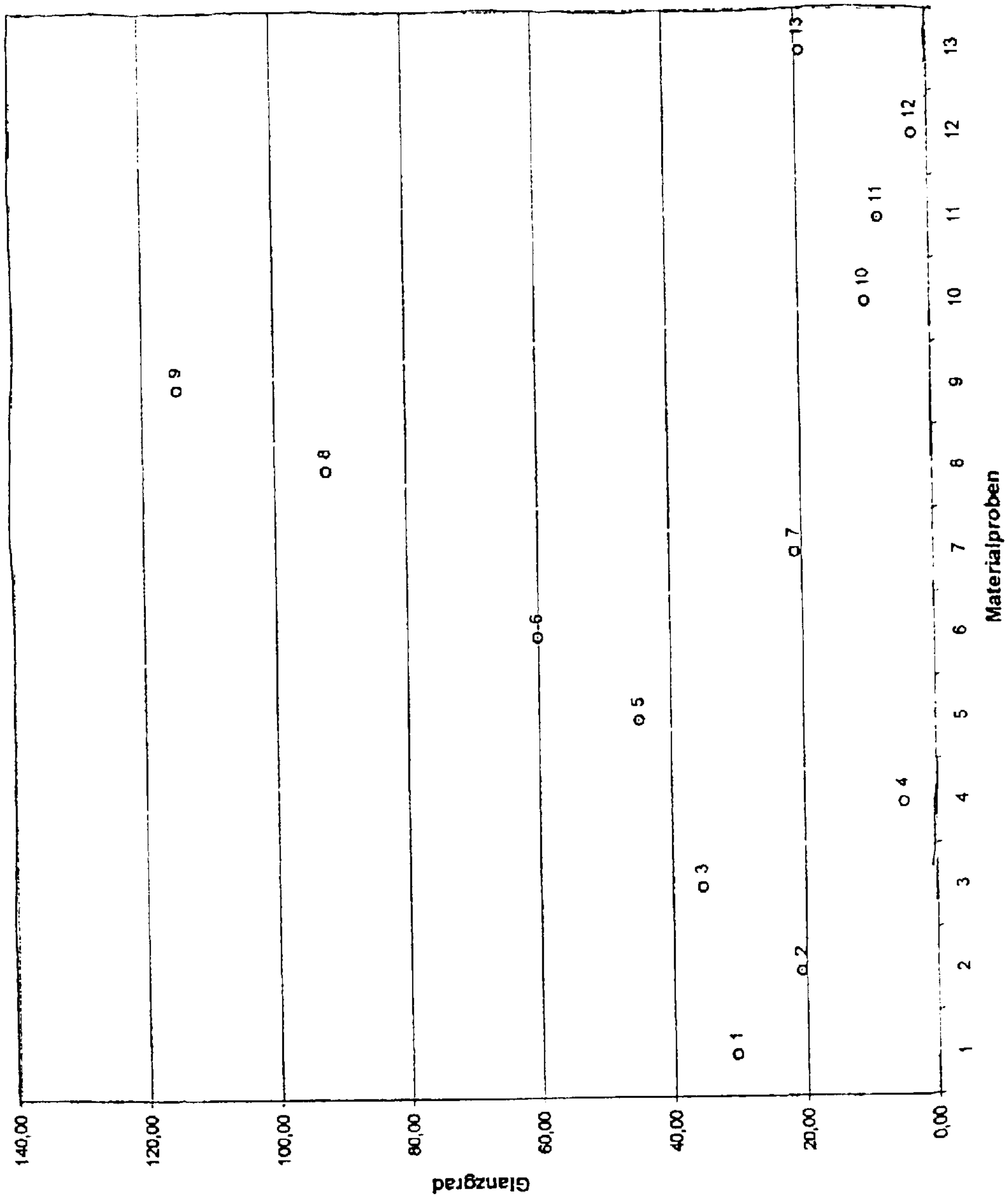
Figure 4:
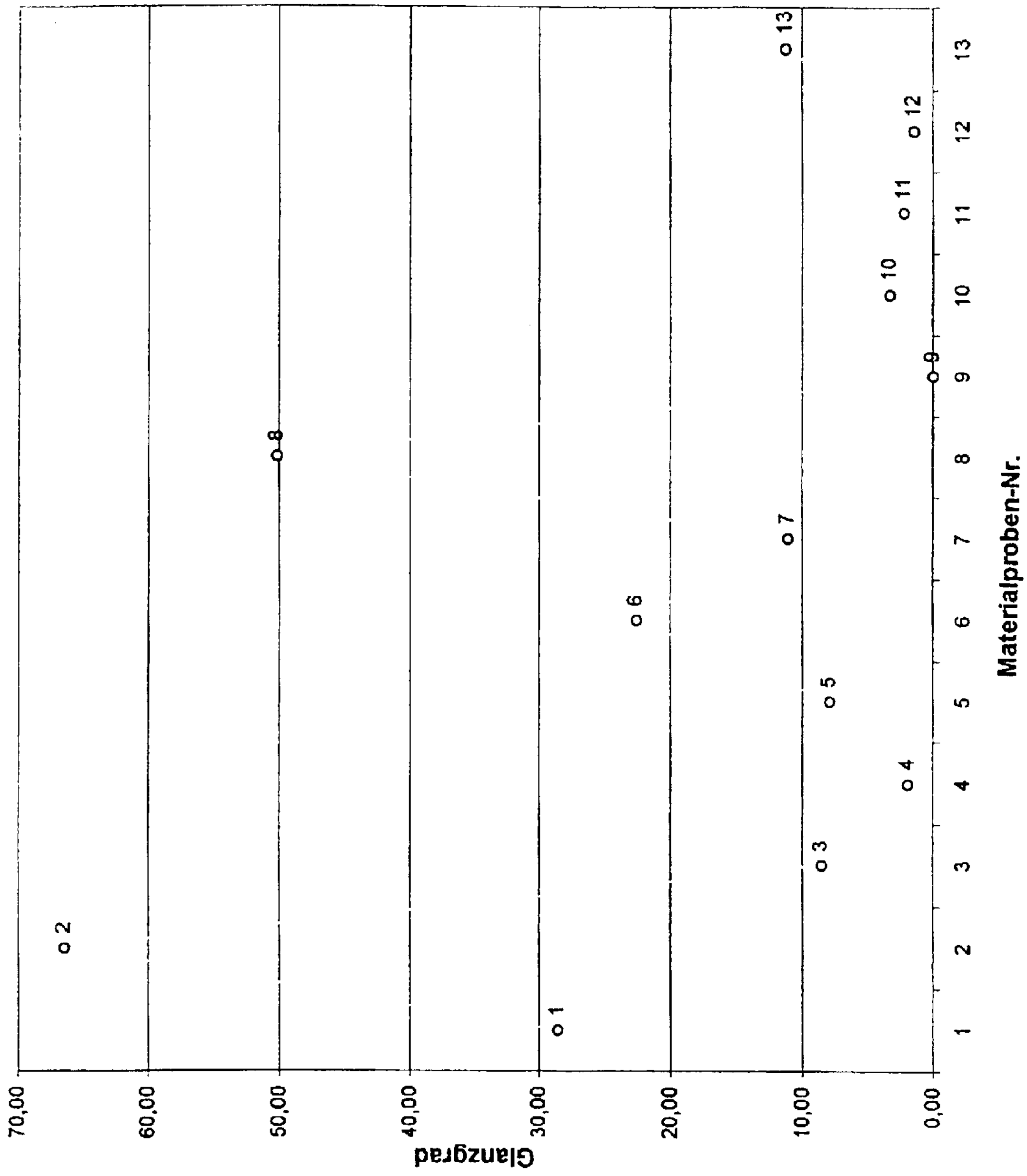
Figure 5:
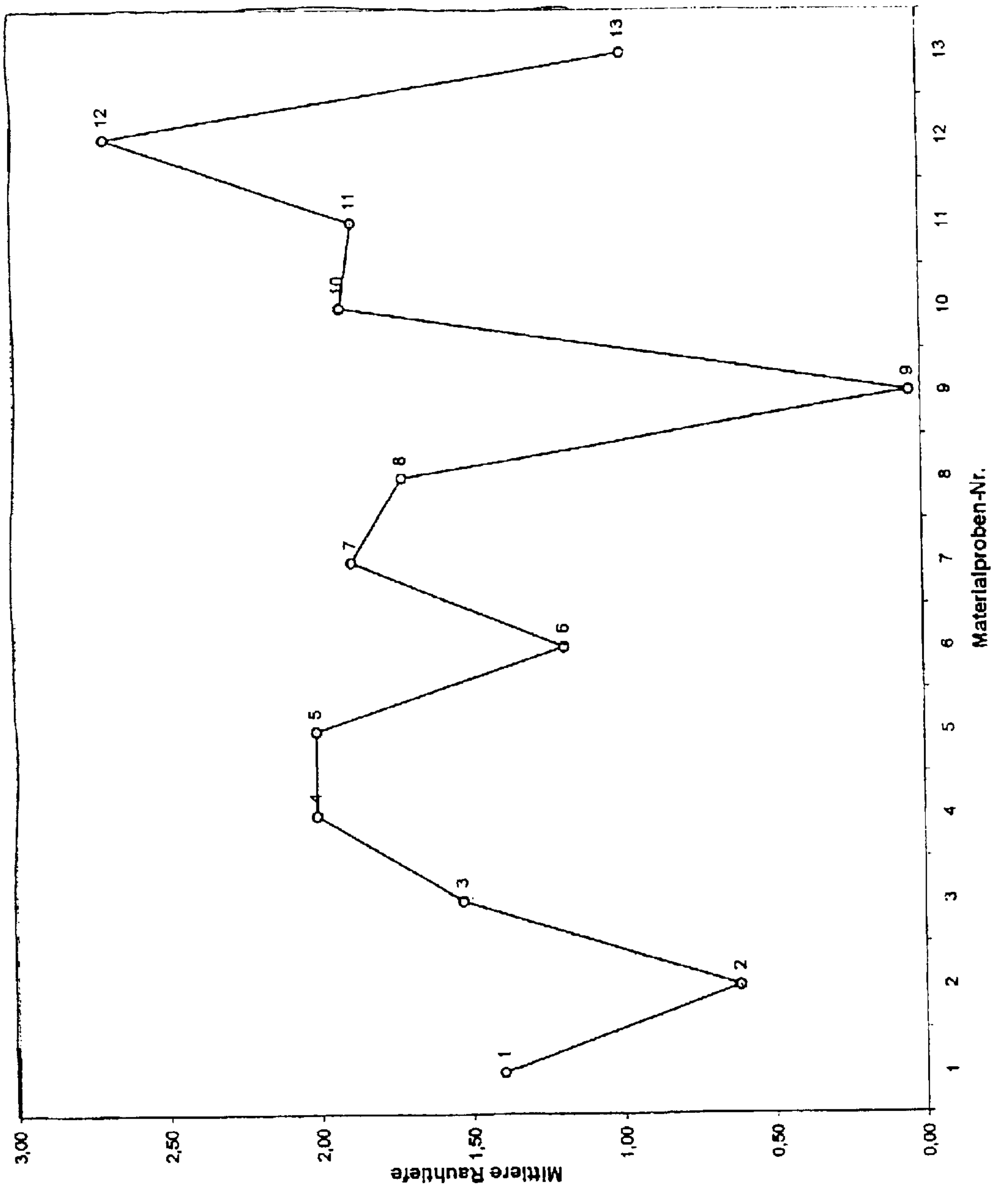
FIG. 5 shows the intermediate peak-to-valley height for the material probes according to FIG. 4.

In FIG. 4, illustrations A, B, and C show the degree of glare with 20°, 60° and 85° angles of incidence for a series of material probes. FIG. 5 shows the corresponding intermediate peak-to-valley heights. The probes are subsequently listed:

1. Material Series DX52 D+AS Front-side unlacquered;
2. Material Series DX53 D+AS Backside black-lacquered;
3. DX53 D+AS topochromatically glazed;
4. DX53 D+AS, sand blasted with powder;
5. DX53 D+AS topochromatically glazed;
6. DX53 D+AS topochromatically glazed;
7. DX53 D+AS topochromatically glazed, pickled, and refined;
8. DX53 D+AS untreated;
9. DC 01 LC MC (chrome-plated);
10. DX53 D+AS sand blasted with powder;
11. DX53 D+AS sand blasted intensively with powder;
12. DX53 D+AS sand blasted with corundum; and
13. DC 01 LC MC (chrome-plated) sand blasted with powder.

In this connection, it can be seen that through topochromatic glazing or sand blasting with various materials, a specific reduction of the value of the degree of glare and a specific increase of the roughness can be achieved.

In particular, the roughness should be greater than 1 $\mu$m and, specifically, greater than 1.5 to 2.5 $\mu$m or somewhat over this value.

With the degree of glare, the highest values that are achieved should be 20% with 20°, 60% with 60°, and 25% with 85°. In particular, the degree of glare should be less than 10% with 20°, less then 30% with 60°, and less then 12% with 85°.

It will be understood that each of the elements described above, or two or more together, may also find a useful application in other types of constructions differing from the types described above.

While the invention has been illustrated and described herein as headlight for a motor vehicle with a beam shield having at least one structured surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight for a motor vehicle, comprising a clear, front cover plate (12), at least one light source (14), at least one reflector (16) associated with the at least one light source (14), and a beam shield (14) for avoidance of glare produced by headlights of oncoming vehicles, said beam shield (18) disposed between said at least one light source (14) and said cover plate (12), wherein the beam shield (18) has a structured inner surface (26) with no coating on an inner side facing said at least one light source (14).

2. The headlight as defined in claim 1, wherein the structured surface is produced by glazing with a laminate having a roughness and/or a pattern.

3. The headlight as defined in claim 1, wherein the structured surface is produced by stamping the inner side of the beam shield (26).

4. The headlight as defined in claim 1, wherein the structured surface is produced by sand blasting.

5. The headlight as defined in claim 4, wherein the beam shield (18) has only a partially structured surface.

6. The headlight as defined in claim 1, wherein the structured surface has a structure selected from a group consisting of a honeycomb structure, a cross-grid machining guide way structure, a needle-strip structure, a diamond structure, and a pyramid structure.

7. The headlight as defined in claim 1, wherein the structure surface has a structure having peaks and valleys with increased peak-to-valley height.

8. The headlight as defined in claim 1, wherein an outer side of the beam shield is at least partially structured by glazing, stamping, or sand blasting.

9. The headlight as defined in claim 1, wherein the beam shield on the inner side and/or an outer side is chemically treated by etching, maceration, and/or tempering for reducing glare.

10. The headlight as defined in claim 1, wherein the beam shield is eloxadized at least partially on the inner side and/or on an outer side.

11. The headlight as defined in claim 10, wherein the beam shield is color-eloxadized on the inner side and/or outer side.

12. The headlight as defined in claim 11, wherein the inner side of the beam shield is eloxadized to be dark or black.

13. The headlight as defined in claim 1, wherein the beam shield comprises a top area and a holder and is made of one or two parts.

14. The headlight as defined in claim 13, wherein said top area is provided with dark or black eloxadized aluminum or embedded aluminum parts.

15. The headlight as defined in claim 1, wherein the inner side and/or an outer side of the beam shield is chrome-plated.

16. The headlight as defined in claim 1, wherein an outer side of the beam shield is colored-coated and/or lacquered.

17. The headlight as defined in claim 1, wherein a top of the beam shield has a cap and wherein the cap is color-lacquered, coated, and/or eloxadized.

18. The headlight as defined in claim 1, wherein an outer side of the beam shield has a geometric pattern structuring.

19. The headlight as defined in claim 1, wherein the beam shield is made from a material selected from the group consisting of steel with an aluminum-silicon coating, in particular, from DX53 D+As; steel with an aluminum or aluminum-alloy coating; and aluminum-plated or aluminum-alloy-plated steel.

20. The headlight as defined in claim 1, wherein the structured surface of the inner side of the beam shield has peaks and valleys and wherein the inner side of the beam shield has an intermediate peak-to-valley height of 0.1 to 3.0 $\mu$m.

21. The headlight as defined in claim 1, wherein the structured surface of the inner side of the beam shield has peaks and valleys and wherein the inner side of the beam shield has an intermediate peak-to-valley height of 1.0 to 3.0 $\mu$m.

22. The headlight as defined in claim 1, wherein the structured surface of the inner side of the beam shield has peaks and valleys and wherein the inner side of the beam shield has an intermediate peak-to-valley height of 1.5 to 3.0 $\mu$m.

23. The headlight as defined in claim 1, wherein a degree of glare of the surface of the inner side of the beam shield is less than 20% with an angle of incidence of 20°, less than 60% with an angle of incidence of 60°, and less than 25% with an angle of incidence of 85°.

24. The headlight as defined in claim 1, wherein a degree of glare of the surface of the inner side of the beam shield is less than 10% with an angle of incidence of 20°, less than 30% with an angle of incidence of 60°, and less than 12% with an angle of 85°.

* * * * *